(12) United States Patent
Huang

(10) Patent No.: US 12,055,818 B2
(45) Date of Patent: Aug. 6, 2024

(54) DISPLAY PANEL AND ELECTRONIC DEVICE

(71) Applicant: Huizhou China Star Optoelectronics Display Co., Ltd., Guangdong (CN)

(72) Inventor: Dongchen Huang, Guangdong (CN)

(73) Assignee: Huizhou China Star Optoelectronics Display Co., Ltd., Huizhou (CN)

( * ) Notice: Subject to any disclaimer, the term of this patent is extended or adjusted under 35 U.S.C. 154(b) by 0 days.

(21) Appl. No.: 17/438,530

(22) PCT Filed: Jun. 17, 2021

(86) PCT No.: PCT/CN2021/100665
§ 371 (c)(1),
(2) Date: Sep. 13, 2021

(87) PCT Pub. No.: WO2022/257167
PCT Pub. Date: Dec. 15, 2022

(65) Prior Publication Data
US 2024/0027835 A1    Jan. 25, 2024

(30) Foreign Application Priority Data
Jun. 7, 2021    (CN) .................. 202110632436.2

(51) Int. Cl.
*G02F 1/13357*    (2006.01)
*G02F 1/1335*    (2006.01)

(52) U.S. Cl.
CPC .. *G02F 1/133621* (2013.01); *G02F 1/133512* (2013.01); *G02F 1/133514* (2013.01); *G02F 1/133606* (2013.01)

(58) Field of Classification Search
CPC ......... G02F 1/133621; G02F 1/133512; G02F 1/133514; G02F 1/133606
See application file for complete search history.

(56) References Cited

U.S. PATENT DOCUMENTS

| | | | |
|---|---|---|---|
| 2011/0242449 A1* | 10/2011 | Chang | G02F 1/157 349/61 |
| 2012/0044443 A1* | 2/2012 | Han | G02B 6/005 349/106 |
| 2013/0176512 A1* | 7/2013 | Posner | G02F 1/1333 349/193 |

(Continued)

FOREIGN PATENT DOCUMENTS

| | | |
|---|---|---|
| CN | 102879946 | 1/2013 |
| CN | 109100892 | 12/2018 |

(Continued)

*Primary Examiner* — Jonathan Y Jung

(57) ABSTRACT

The present application provides a display panel and an electronic device. The display panel includes a panel body, a backlight module, and a light sensor. The panel body includes a color changing layer including a transparent state and a color state. The backlight module includes first backlight sources. Incident light passes through the panel body and is received by the light sensor when the color changing layer is in the transparent state, so as to realize a sensing function. The color state of the color changing layer cooperates with the first light sources to enable the display panel to realize a display function, which is beneficial to realize a full-screen display design of the display panel.

17 Claims, 3 Drawing Sheets

(56) References Cited

U.S. PATENT DOCUMENTS

| | | | | |
|---|---|---|---|---|
| 2021/0072594 A1* | 3/2021 | Zhang | ................ | G02F 1/133603 |
| 2021/0405407 A1* | 12/2021 | Sun | ................... | G02F 1/133331 |
| 2021/0405415 A1* | 12/2021 | Li | .......................... | G06F 1/3265 |
| 2023/0088587 A1* | 3/2023 | Zhang | .................... | G02B 6/004 |
| | | | | 362/97.1 |

FOREIGN PATENT DOCUMENTS

| | | |
|---|---|---|
| CN | 208384291 | 1/2019 |
| CN | 208384429 | 1/2019 |
| CN | 109541849 | 3/2019 |
| CN | 111766740 | 10/2020 |
| CN | 112019717 | 12/2020 |
| CN | 112068356 | 12/2020 |
| KR | 10-2087104 | 4/2020 |

\* cited by examiner

DISPLAY PANEL AND ELECTRONIC DEVICE

RELATED APPLICATIONS

This application is a National Phase of PCT Patent Application No. PCT/CN2021/100665 having International filing date of Jun. 17, 2021, which claims the benefit of priority of Chinese Patent Application No. 202110632436.2 filed on Jun. 7, 2021. The contents of the above applications are all incorporated by reference as if fully set forth herein in their entirety.

FIELD AND BACKGROUND OF THE INVENTION

The present application is related to the field of display technology and specifically to a display panel and an electronic device.

With improvements of display technology, full-screen display devices, narrow-bezel display devices, high-resolution display devices, etc. have become mainstream development trends in display fields. Since the full-screen display devices can bring a better visual experience, users' demands for the full-screen display devices are increasing. However, in order to take designs of cameras into account, the current full-screen display devices generally have through holes or blind holes at a bottom of screens to place the cameras. As a result, regions of display panels correspond to the cameras cannot display images. Therefore, a real full-screen display design cannot be realized.

SUMMARY OF THE INVENTION

The present application provides a display panel and an electronic device to solve a problem that a first display region cannot balance a display function and a sensing function.

The present application provides a display panel. The display panel includes a panel body, a backlight module, and a light sensor.

The panel body includes a first display region and a second display region adjacent to each other. The panel body further includes a plurality of first subpixels positioned in the first display region and a plurality of second subpixels positioned in the second display region. The first subpixels and the second subpixels include a first substrate. The first substrate includes a color changing layer positioned in the first display region.

The backlight module is disposed on a side of the panel body. The backlight module includes a first backlight portion. The first backlight portion includes first light sources. The first light sources correspond to the first display region.

The light sensor is disposed on the side of the panel body and corresponding to the first display region.

The color changing layer includes a transparent state and a color state. Incident light passes through the color changing layer and is received by the light sensor when the color changing layer is in the transparent state. Light from the first light sources passes through the color changing layer when the color changing layer is in the color state.

Optionally, in an embodiment of the present application, the color changing layer further includes a plurality of color changing units, the first substrate further includes a first black matrix positioned in the first display region, the first black matrix includes a plurality of openings, each of the color changing units is disposed in a corresponding one of the openings, and each of the color changing units includes the color state and the transparent state.

Optionally, in an embodiment of the present application, an arrangement of the color changing units is same as an arrangement of the second subpixels away from the first display region when the color changing layer is in the color state.

Optionally, in an embodiment of the present application, the first substrate further includes a color filter layer, the color filter layer includes a second black matrix and a color resist layer positioned in the second display region, the second black matrix and the first black matrix are in a same layer and have a same material, and the color resist layer and the color changing layer are in a same layer.

Optionally, in an embodiment of the present application, the first backlight portion further includes a light control layer disposed between the light sensor and the panel body, the light control layer includes a transparent state and a matte state, the light control layer is in the transparent state to allow the incident light to pass through when the color changing layer is in the color state, and the light control layer is in the matte state to scatter the light from the first light sources with a scattering structure of the light control layer when the color changing layer is in the color state.

Optionally, in an embodiment of the present application, the first light sources correspond to the first display region and are disposed on a side of the light control layer away from the panel body.

Optionally, in an embodiment of the present application, the light sensor is disposed in the first backlight portion and is surrounded by the first light sources.

Optionally, in an embodiment of the present application, the backlight module further includes a backplate and a second backlight portion, the backplate is disposed under the first backlight portion and the second backlight portion, the backplate is provided with a groove, the groove corresponds to the first display region, the first light sources are disposed in the groove, the second backlight portion corresponds to the second display region, the second backlight portion includes second light sources, and the second light sources are disposed on the backplate.

Optionally, in an embodiment of the present application, the backplate includes a first surface, a second surface, and a connecting surface connecting the first surface and the second surface, the first surface is disposed under the second surface, an angle between the connecting surface and the first surface is an obtuse angle, an angle between the connecting surface and the second surface is an obtuse angle, the backplate is provided with a through hole, the first surface, the second surface, and the connecting surface surround the through hole, and the first light sources are disposed on the first surface.

Optionally, in an embodiment of the present application, the backlight module further includes a backplate and a second backlight portion, the second backlight portion includes second light sources, the first light sources and the second light sources are disposed on the backplate and are in a same layer, and a distribution density of the second light sources is less than a distribution density of the first light sources.

Optionally, in an embodiment of the present application, an outer surface of the light sensor is provided with a reflective layer, and the reflective layer reflects the light from the first light sources.

Optionally, in an embodiment of the present application, the first subpixels and the second subpixels further include a second substrate and a liquid crystal layer disposed between the first substrate and the second substrate, and the second substrate is disposed between the first substrate and the backlight module.

Optionally, in an embodiment of the present application, the panel body further includes a first light-shielding layer, and the first light-shielding layer is disposed between the first substrate and the second substrate and is adjacent to a junction of the first display region and the second display region.

Optionally, in an embodiment of the present application, the backlight module further includes a second light-shielding layer, and the second light-shielding layer is adjacent to a junction of the first backlight portion and the second backlight portion.

Optionally, in an embodiment of the present application, the color changing layer further includes an electrochromic layer.

Optionally, in an embodiment of the present application, the backlight module further includes a reflective sheet, and the reflective sheet is disposed on the backplate and between any two of the first light sources.

The present application further provides an electronic device. The electronic device includes any one of the above display panels.

In the display panel and the electronic device provided by the present application, the display panel includes the panel body, the backlight module, and the light sensor. The panel body includes the first display region and the second display region adjacent to each other. The panel body further includes the plurality of first subpixels positioned in the first display region and the plurality of second subpixels positioned in the second display region. The first subpixels and the second subpixels include the first substrate. The first substrate includes the color changing layer positioned in the first display region. The backlight module is disposed on the side of the panel body. The backlight module includes the first backlight portion. The first backlight portion includes the first light sources. The first light sources correspond to the first display region. The light sensor is disposed on the side of the panel body and corresponding to the first display region. The color changing layer includes the transparent state and the color state. The incident light passes through the color changing layer and is received by the light sensor when the color changing layer is in the transparent state, so as to realize a sensing function. The light from the first light sources passes through the color changing layer when the color changing layer is in the color state. The color changing layer cooperates with the first light sources to provide a backlight for the first display region, so that the display panel realizes a display function in the first display region. This enables the first display region to have both of the display function and the sensing function, which is beneficial to realize a full-screen display design of the display panel.

DESCRIPTION OF SPECIFIC EMBODIMENTS OF THE INVENTION

In order to make purposes, technical solutions, and effects of the present application clearer and more specific, the present application is further described in detail below with reference to the accompanying drawings and examples. It should be understood that the specific embodiments described herein are only used to explain the application, and are not used to limit the present application.

Figure 1A:
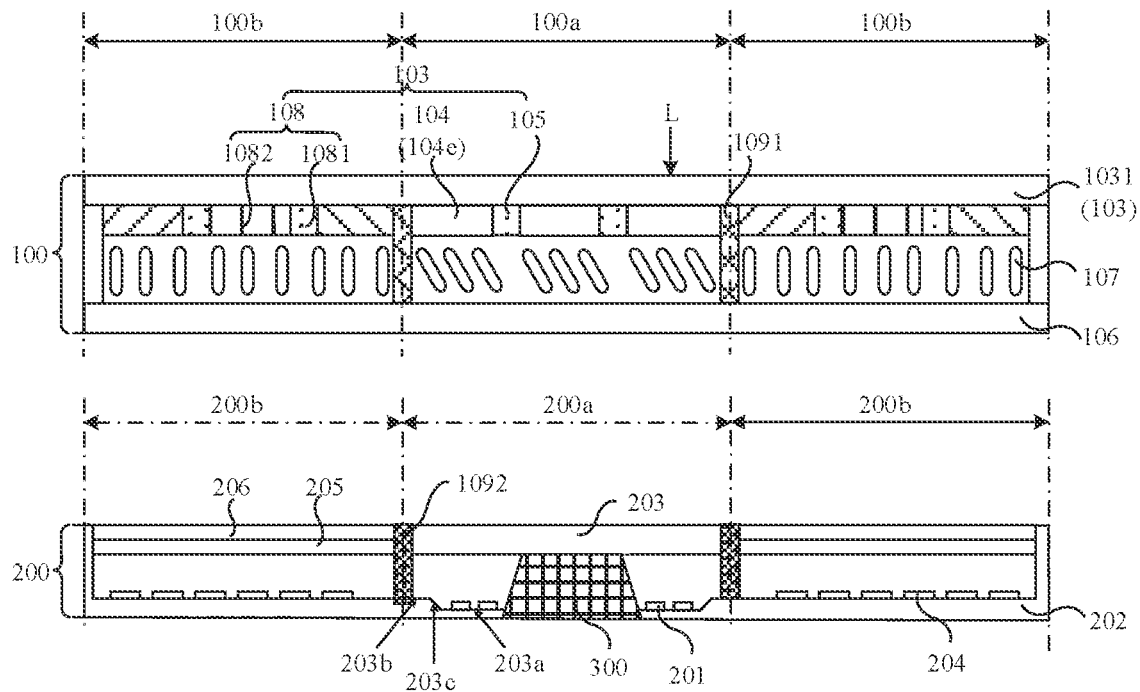
FIGS. 1A-1B are structural schematic diagrams of a display panel provided by an embodiment of the present application.
Figure 1B:
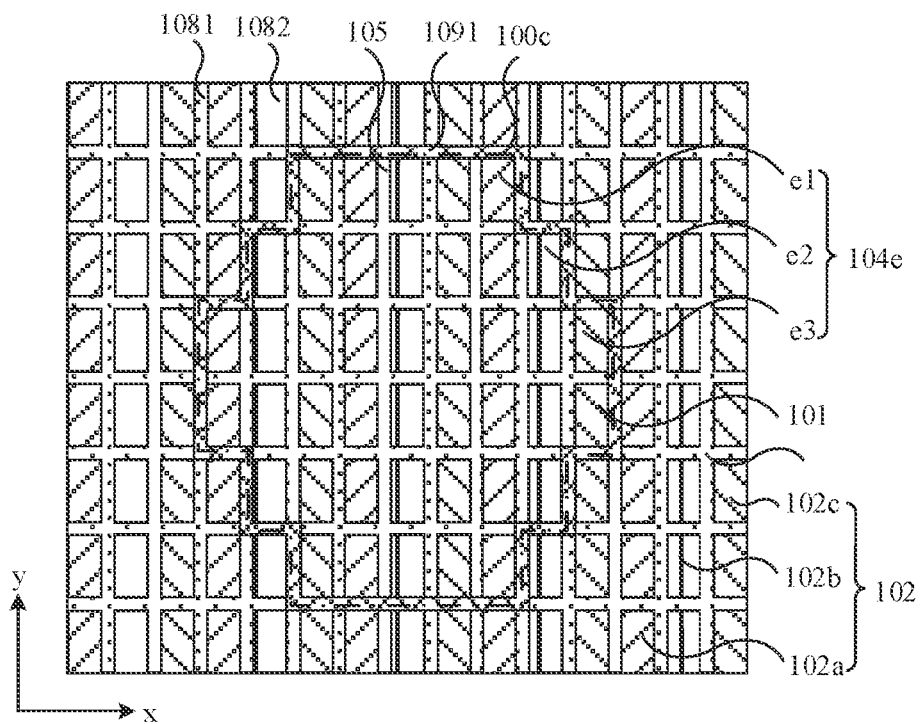
Figure 1C:
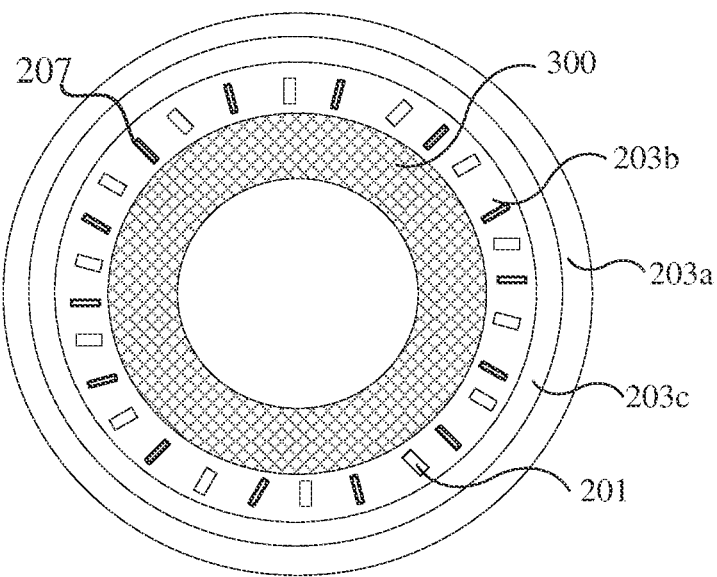
FIG. 1C is a top-view of a schematic diagram of a first display region provided by an embodiment of the present application.

Specifically, FIGS. 1A-1B are structural schematic diagrams of a display panel provided by an embodiment of the present application, and FIG. 1C is a top-view of a schematic diagram of a first display region provided by an embodiment of the present application. An embodiment of the present application provides a display panel. The display panel includes a panel body 100, a backlight module 200, and a light sensor 300.

The panel body 100 includes a first display region 100a and a second display region 100b adjacent to each other. Optionally, the first display region 100a is positioned in the second display region 100b, and the first display region 100a and the second display region 100b include a polyline junction 100c.

The display body 100 further includes a plurality of first subpixels 101 and a plurality of second subpixels 102. The first subpixels 101 are positioned in the first display region 100a. The second subpixels 102 are positioned in the second display region 100b. The first subpixels 101 and the second subpixels 102 include a first substrate 103. The first substrate 103 includes a color changing layer 104 positioned in the first display region 100a. The color changing layer 104 includes a transparent state and a color state.

The backlight module 200 is disposed on a side of the panel body 100. The backlight module 200 includes a first backlight portion 200a. The first backlight portion 200a includes first light sources 201. The first backlight portion 200a corresponds to the first display region 100a. The first light sources 201 correspond to the first display region 100a.

Optionally, the first light sources 201 are light-emitting devices. The light-emitting devices include organic light-emitting diodes, mini light-emitting diodes, or micro light-emitting diodes.

The light sensor 300 is disposed on the side of the panel body 100 and corresponds to the first display region 100a. Specifically, the light sensor 300 and the backlight module 200 are disposed on the same side of the panel body 100. The light sensor 300 is disposed in the first backlight portion 200a. The first light sources 201 surround the light sensor 300.

Optionally, the light sensor 300 includes a camera, a fingerprint sensor, a distance sensor, etc. The backlight module 200 includes a backplate 202. The backplate 202 is provided with a through hole. The through hole corresponds to the first display region 100a. The light sensor 300 faces the through hole, so that the light sensor 300 is disposed in the first backlight portion 200a, and the first light sources 201 surround the light sensor 300.

When the color changing layer 104 is in the color state, the first light sources 201 are turned on, and light emitted by the first light sources 201 passes through the color changing layer 104. The first light sources 201 provide a backlight for the first display region 100a of the panel body 100, so as to realize a display function of the display panel in the first display region 100a. When the color changing layer 104 is in the transparent state, incident light L passes through the color changing layer 104 in the panel body 100 and is received by the light sensor 300. A sensing function of the display panel is realized by the light sensor 300.

The color changing layer 104 is disposed in the display panel. The color changing layer 104 in the color state can be configured to cooperate with the light emitted by the first light sources 201, so as to realize the display function of the display panel in the first display region 100a. The color changing layer 104 in the transparent state can be configured to cooperate with the light sensor 300, so as to realize the sensing function of the display panel when the first display region 100a does not display images.

Optionally, the color changing layer 104 includes a field-induced color changing layer. Furthermore, the field-induced color changing layer includes a thermochromic material, an electrochromic material, a photochromic material, or a gas-induced color changing material.

Figure 2:
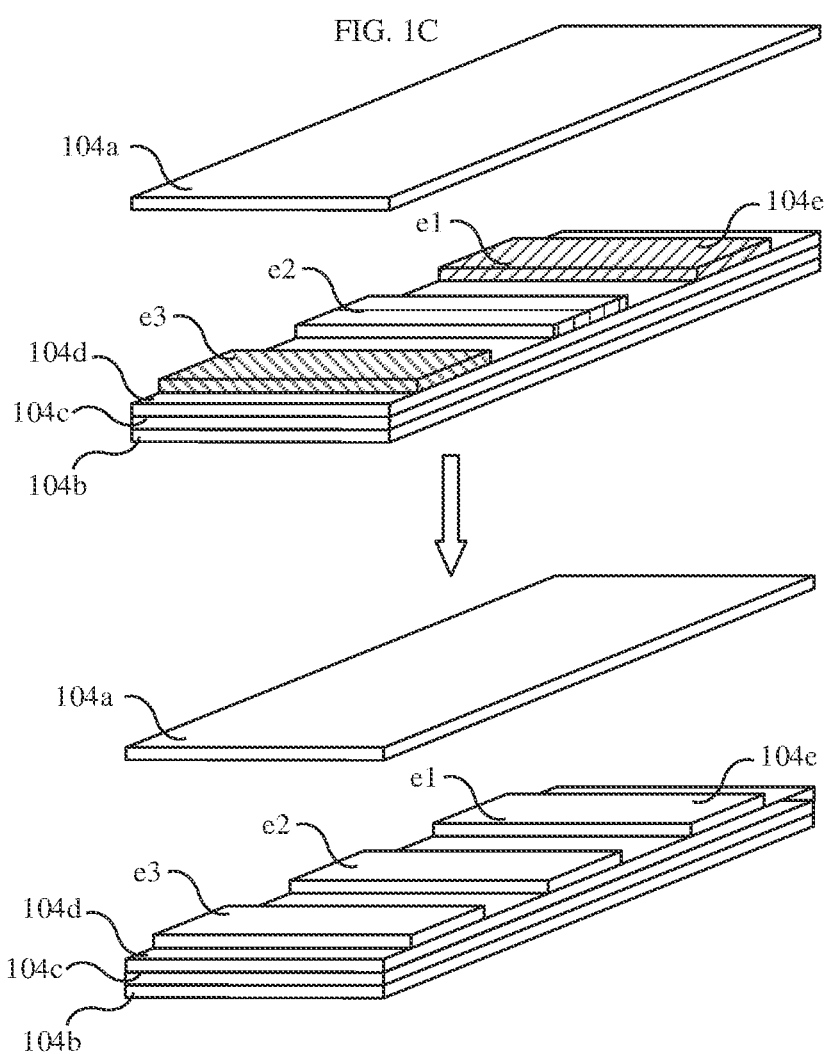
FIG. 2 is a structural schematic diagram of a color changing layer provided by an embodiment of the present application.

Optionally, the color changing layer 104 includes an electrochromic layer. Specifically, as shown in FIG. 2, which is a structural schematic diagram of the color changing layer provided by an embodiment of the present application, the electrochromic layer includes a first electrode 104a, a second electrode 104b, and an ion storage layer 104c, an ion transport layer 104d, and a plurality of color changing units 104e disposed between the first electrode 104a and the second electrode 104b.

The first electrode 104a and the second electrode 104b are transparent electrodes. Materials of the first electrode 104a and the second electrode 104b include indium tin oxide or the like. The first electrode 104a includes a plurality of first sub-electrodes. The second electrode 104b includes a plurality of second sub-electrodes. The first sub-electrodes correspond to the second sub-electrodes. The color changing units 104e are disposed between the first sub-electrodes and the second sub-electrodes. When a voltage is applied to one of the first sub-electrodes and a corresponding one of the second sub-electrodes, ions stored in the ion storage layer 104c pass through the ion transport layer 104d under an electric field and are combined with a color changing material in one of the color changing units 104e disposed between the one of the first sub-electrodes and the one of the second sub-electrodes, so as to enable the color changing layer 104 to have the color state. Correspondingly, when no voltage is applied to the one of the first sub-electrodes and the corresponding one of the second sub-electrodes, the one of the color changing units 104e disposed between the one of the first sub-electrodes and the one of the second sub-electrodes is transparent, so as to enable the color changing layer 104 to have the transparent state.

Optionally, the ion transport layer 104d includes a liquid electrolyte, an inorganic solid electrolyte, or a polymer electrolyte.

Optionally, the color changing units 104e include an organic electrochromic material, an inorganic electrochromic material, or a composite color changing material.

Optionally, the color changing units 104e have different color states. Specifically, the color changing units 104e include a first sub-color changing units e1, a second sub-color changing units e2, and a third sub-color changing units e3. When the first sub-color changing units e1, the second sub-color changing units e2, and the third sub-color changing units e3 are in the color state, the first sub-color changing units e1, the second sub-color changing units e2, and the third sub-color changing units e3 display different colors. Optionally, the first sub-color changing units e1 display red color when it is in the color state, the second sub-color changing units e2 display green color when it is in the color state, and the third sub-color changing units e3 display blue color when it is in the color state. The first sub-color changing units e1 include a red polythiophene-based electrochromic material, the second sub-color changing units e2 include a green polythiophene-based electrochromic material, and the third sub-color changing units e3 include a blue polythiophene-based electrochromic material, Prussian blue, tungsten trioxide (WO3), molybdenum trioxide (MoO3), etc.

Please continue to refer to FIGS. 1A-1B. The color changing layer 104 includes the color changing units 104e. Each of the color changing units 104e has the color state and the transparent state. The first substrate 103 also includes a first black matrix 105 positioned in the first display region 100a. The first black matrix 105 includes a plurality of openings. Each of the color changing units 104e is disposed in a corresponding one of the openings.

Furthermore, in order to reduce a display difference between the first display region 100a and the second display region 100b of the display panel, an arrangement of the second subpixels 102 is same as an arrangement of the first subpixels 101.

The first subpixels 101 cooperate with the first light sources 201 to realize a color display through the color changing units 104e in the color state. Therefore, an arrangement of the color changing units 104e can make the first subpixels 101 and the second subpixels 102 have a same arrangement structure. In other words, when the color changing layer 104 is in the color state, an arrangement of the color changing units 104e is same as an arrangement of the second subpixels 102 away from the first display region 100a. Specifically, please continue to refer to FIGS. 1A-1B, taking the second subpixels 102 in the second display region 100b with a standard RGB arrangement as an example for description, the second subpixels 102 include first-color subpixels 102a, second-color subpixels 102b, and third-color subpixels 102c with different light-emitting colors. One of the first-color subpixels 102a, one of the second-color subpixels 102b, and one of the third-color subpixels 102c are sequentially arranged along a first direction x. The first-color subpixels 102a are arranged along a second direction y. The second-color subpixels 102b are arranged along the second direction y. The third-color subpixels 102c are arranged along the second direction y. Optionally, a light color emitted by the first-color subpixels 102a is red, a light color emitted by the second-color subpixels 102b is green, and a light color emitted by the third-color subpixels 102c is blue.

The color changing units 104e include the first sub-color changing units e1, the second sub-color changing units e2, and the third sub-color changing units e3. The first sub-color changing units e1 display red color when it is in the color state, the second sub-color changing units e2 display green color when it is in the color state, and the third sub-color changing units e3 display blue color when it is in the color state. In the first direction x, the first sub-color changing units e1, the second sub-color changing units e2, and the third sub-color changing units e3 are arranged in sequence. In a top view, the first sub-color changing units e1 and the first color subpixels 102a are arranged along the second direction y, and the second sub-color changing units e2 and the second color subpixels 102b are arranged along the second direction y, and the third sub-color changing units e3 and the third color subpixels 102c are arranged along the second direction y. Therefore, when the first sub-color changing units e1, the second sub-color changing units e2, and the third sub-color changing units e3 are in the color state, they display colors same as the light colors emitted by the first-color subpixels 102a, the second-color subpixels 102b, and the third-color subpixels 102c, so as to reduce the display difference between the first display region 100a and the second display region 100b.

Please continue to refer to FIGS. 1A-1B. The first backlight portion 200a further includes a light control layer 203. The light control layer 203 is disposed between the light sensor 300 and the panel body 100. The light control layer 203 includes a transparent state and a matte state. When the light control layer 203 is in the transparent state, the color changing layer 104 is also in the transparent state, the first light sources 201 are turned off, and the incident light L enters the light sensor 300 through the panel body 100. When the light control layer 203 is in the matte state, the color changing layer 104 is in the color state, the first light sources 201 is turned on, and the light control layer 203 scatter the light of the first light sources 201 with a scattering structure.

Specifically, the light control layer 203 further includes a third electrode, a fourth electrode, and an optical layer disposed between the third electrode and the fourth electrode. The optical layer includes polymer network liquid crystals or polymer dispersed liquid crystals. Furthermore, the optical layer includes the polymer network liquid crystals. When a percentage content of photopolymerizable monomers in the light control layer 203 ranges from 10% to 20%, the light control layer 203 is in the matte state if there is no electric field between the third electrode and the fourth electrode, and the light control layer 203 is in the transparent state if there is an electric field between the third electrode and the fourth electrode. When the percentage content of the photopolymerizable monomers in the light control layer 203 is less than 10%, the light control layer 203 is in the transparent state if there is no electric field between the third electrode and the fourth electrode, and the light control layer 203 is in the matte state if there is the electric field between the third electrode and the fourth electrode. Furthermore, the optical layer includes polymer dispersed liquid crystals. The light control layer 203 is in the matte state if there is no electric field between the third electrode and the fourth electrode. The light control layer 203 is in the transparent state if there is an electric field between the third electrode and the fourth electrode.

The first light sources 201 are disposed on a side of the light control layer 203 away from the panel body 100. The first light sources 201 correspond to the first display region 100a. Specifically, please continue to refer to FIGS. 1A-1C, the backlight module 200 includes a backplate 202. The backplate 202 is provided with a groove. The groove corresponds to the first display region 100a. The first light sources 201 are disposed in the groove.

Specifically, the backplate 202 includes a first surface 203a, a second surface 203b, and a connecting surface 203c connecting the first surface 203a and the second surface 203b. The first surface 203a is disposed under the second surface 203b. There is a first included angle between the connecting surface 203c and the first surface 203a. The connecting surface 203c and the second surface 203b include a second included angle. The first surface 203a, the second surface 203b, and the connecting surface 203c surround the through hole. The first included angle is an obtuse angle, the second included angle is an obtuse angle, and the first light sources 201 are disposed on the first surface 203a, so that the first light sources 201 surround the light sensor 300. Optionally, the first included angle and the second included angle can further be right angles.

The first light sources 201 disposed on the first surface 203a and surrounding the light sensor 300 can enable the backlight module 200 to provide the backlight for the first display region 100a through the first light sources 201. Moreover, since the first surface 203a is disposed under the second surface 203b, a distance between the first surface 203a and the panel body 100 is greater than a distance between the second surface 203b and the panel body 100. When the first light sources 201 are disposed on the first surface 203a, the first light sources 201 irradiate on the panel body 100 will overlap each other, so that the first light sources 201 produce a light mixing effect. This can eliminate a problem of a darker display of a portion of the first display region 100a corresponding to the light sensor 300 when displaying mages.

In addition, the first surface 203a and the second surface 203b can further be disposed on a same horizontal plane. In this configuration, a distribution density of the first light sources 201 can be greater than a distribution density of the first light sources 201 when the first surface 203a is disposed under the second surface 203b. This eliminates the problem of the darker display of the portion of the first display region 100a corresponding to the light sensor 300 by increasing the distribution density of the first light sources 201.

Furthermore, an outer surface of the light sensor 300 is further provided with a reflective layer. The reflective layer is configured to reflect the light of the first light sources 201 to increase the light mixing effect. This further eliminates the problem of the darker display of the portion of the first display region 100a corresponding to the light sensor 300 when displaying mages.

Optionally, a material of the reflective layer includes a metallic material such as silver and aluminum or a material such as white ink.

Optionally, as shown in FIG. 1C, the backlight module 200 further includes a reflective sheet 207. The reflective sheet 207 is disposed on the backplate 202 and is disposed between any two of the first light sources 201. This further increases a reflection of the light emitted by the first light sources 201.

Please continue to refer to FIGS. 1A-1B, the second display region 100b can be a self-luminous display region or a passive-luminous display region. Furthermore, the second display region 100b is the passive-luminous display region. The second subpixels 102 and the first subpixels 101 further include a second substrate 106 and a liquid crystal layer 107 disposed between the first substrate 103 and the second substrate 106. The second substrate 106 is disposed between the first substrate 103 and the backlight module 200.

Correspondingly, the backlight module 200 further includes a second backlight portion 200b. The second backlight portion 200b corresponds to the second display region 100b. The second backlight portion 200b includes second light sources 204. The second light sources 204 are disposed on the backplate 202. The second light sources 204 provide a backlight for the second display region 100b.

Optionally, the second light sources 204 are edge light sources or direct light sources. Furthermore, the second light sources 204 are direct light sources, and the first light sources 201 and the second light sources 204 are disposed in a same layer. The second backlight portion 200b includes a diffusion plate 205, a brightness enhancement film 206, and the like on the second light sources 204.

Optionally, a distribution density of the second light sources 204 is less than the distribution density of the first light sources 201. A portion of the first display region 100a corresponding to the light sensor 300 and the second display region 100b has a similar display effect through the first light sources 201, so as to reduce the display difference between the first display region 100a and the second display region 100b.

In order to achieve a full-color display of the second display region 100b, the first substrate 103 further includes a color filter layer 108. The color filter layer 108 includes a second black matrix 1081 and a color resist layer 1082 disposed in the second display region 100b. The first black matrix 105 and the second black matrix 1081 are in a same layer and have a same material. The color resist layer 1082 and the color changing layer 104 are in a same layer.

Furthermore, the first substrate 103 further includes a substrate 1031. The color filter layer 108, the first black matrix 105, and the color changing layer 104 are disposed on the substrate 1031. Optionally, the substrate 1031 includes a rigid substrate (e.g., glass, etc.) or a flexible substrate (e.g., polyimide, etc.).

In order to prevent a display interference from occurring between the first display region 100a and the second display region 100b, the panel body 100 is provided with a first light-shielding layer 1091 adjacent to a junction of the first display region 100a and the second display region 100b. Specifically, the first light-shielding layer 1091 is disposed between the first substrate 103 and the second substrate 106 and is adjacent to the junction of the first display region 100a and the second display region 100b.

In order to prevent a backlight interference from occurring between the first backlight portion 200a and the second backlight portion 200b, the backlight module 200 is provided with a second light-shielding layer 1092 between the first backlight portion 200a and the second backlight portion 200b, and the second light-shielding layer 1092 is adjacent to the junction of the first backlight portion 200a and the second backlight portion 200b.

Optionally, the first light-shielding layer 1091 includes a black photoresist. The second light-shielding layer 1092 is black ink to block light emitted by the second light sources 204 from entering the light control layer 203.

It can be understood that the display panel further includes unshown parts such as pixel electrodes, common electrodes, and touch electrodes. Optionally, the pixel electrodes and the common electrodes can both be disposed on the second substrate 106, or the pixel electrodes can be disposed on the second substrate 106, and the common electrodes can be disposed on the first substrate 103.

Figure 3:
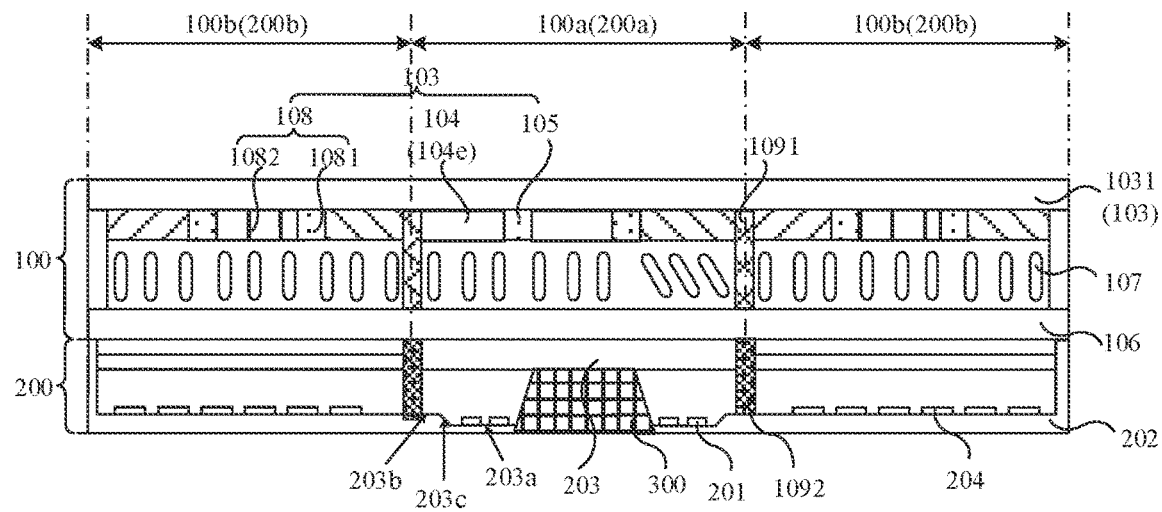
FIG. 3 is a structural schematic diagram of the first display region in a display state provided by an embodiment of the present application.
Figure 4:
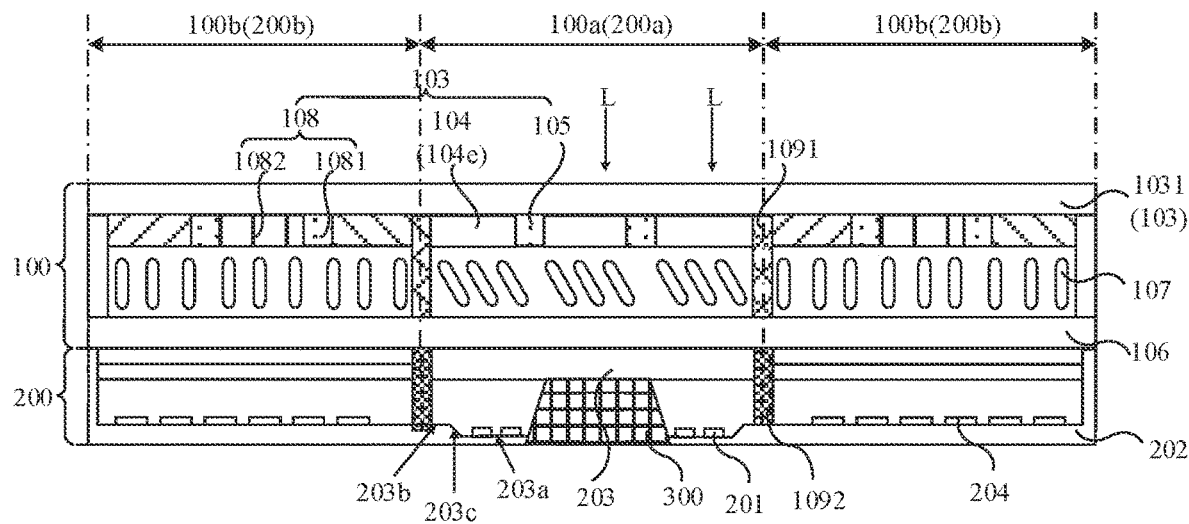
FIG. 4 is a structural schematic diagram of the first display region in a sensing state provided by an embodiment of the present application.

FIG. 3 is a structural schematic diagram of the first display region in a display state provided by an embodiment of the present application. FIG. 4 is a structural schematic diagram of the first display region in a sensing state provided by an embodiment of the present application. Taking the optical layer including the polymer network liquid crystals, the percentage content of the photopolymerizable monomers in the light control layer 203 ranging from 10% to 20%, and the first subpixels 101 including fourth-color subpixels as an example to describe a working principle of the first display region 100a. Optionally, when the fourth-color subpixels display red color, blue color, or green color when they are in the color state.

Please continue to refer to FIG. 3. When the first display region 100a is in the display state, the first light sources 201 are turned on, there is no electric field between the third electrode and the fourth electrode of the light control layer 203, and the light control layer 203 is in the matte state. Meanwhile, there is an electric field between the first electrode 104a and the second electrode 104b of the color changing layer 104 corresponding to the fourth-color subpixels in the first display region 100a, and the color changing layer 104 is in the color state. If there is a driving voltage difference between the pixel electrodes corresponding to the fourth-color subpixels in the first display region 100a and the common electrodes, liquid crystals in the liquid crystal layer 107 will be deflected under the driving voltage difference. As a result, the light emitted by the first light sources 201 is scattered by the light control layer 203, so that the fourth-color subpixels realize the display function.

Please continue to refer to FIG. 4, when the first display region 100a is in the sensing state, the first light sources 201 are turned off, and there is no electric field between the first electrode 104a and the second electrode 104b of the color changing layer 104, and the color changing layer 104 is in the transparent state. Meanwhile, there is an electric field between the third electrode and the fourth electrode of the light control layer 203, and the light control layer 203 is in the transparent state. In the first display region 100a, there is a driving voltage difference between the pixel electrodes and the common electrodes corresponding to the first subpixels 101, so that the liquid crystals in the liquid crystal layer 107 are deflected under the driving voltage difference. The incident light L passes through the panel body 100 and the light control layer 203 and enters the light sensor 300 to realize the sensing function of the display panel.

An embodiment of the present application further provides an electronic device. The electronic device includes any of the above display panels. Optionally, the electronic device includes fixed terminals (e.g., TVs, desktop computers, etc.), mobile terminals (e.g., mobile phones, notebook computers, etc.), wearable devices (e.g., bracelets, VR virtual display devices, and AR enhanced display devices), measuring equipment (e.g., thermometers, etc.), etc.

Embodiments of the present application are described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:
1. A display panel, comprising:
a panel body comprising a first display region and a second display region adjacent to each other and further comprising a plurality of first subpixels positioned in the first display region and a plurality of second subpixels positioned in the second display region, wherein the first subpixels and the second subpixels comprise a first substrate, and the first substrate comprises a color changing layer positioned in the first display region, and a color filter layer positioned in the second display region, wherein the color filter layer and the color changing layer are spaced apart;
a backlight module disposed on a side of the panel body and comprising a first backlight portion, wherein the first backlight portion comprises first light sources corresponding to the first display region; and a light sensor disposed on the side of the panel body and corresponding to the first display region;

wherein the color changing layer further comprises a plurality of color changing units made of electrochromic material, the first substrate further comprises a first black matrix positioned in the first display region, the first black matrix comprises a plurality of openings, each of the color changing units is disposed in a corresponding one of the openings; each of the color changing units comprises a transparent state and a color state, incident light passes through the color changing layer and is received by the light sensor when the color changing unit is in the transparent state, and light from the first light sources passes through the color changing layer when the color changing unit is in the color state.

2. The display panel according to claim 1, wherein an arrangement of the color changing units is same as an arrangement of the second subpixels away from the first display region when the color changing layer is in the color state.

3. The display panel according to claim 1, wherein the color filter layer comprises a second black matrix and a color resist layer, the second black matrix and the first black matrix are in a same layer and have a same material, and the color resist layer and the color changing layer are in a same layer.

4. The display panel according to claim 3, wherein the first subpixels and the second subpixels further comprise a second substrate and a liquid crystal layer disposed between the first substrate and the second substrate, and the second substrate is disposed between the first substrate and the backlight module.

5. The display panel according to claim 4, wherein the panel body further comprises a first light-shielding layer disposed between the first substrate and the second substrate and is adjacent to a junction of the first display region and the second display region.

6. The display panel according to claim 1, wherein the first backlight portion further comprises a light control layer disposed between the light sensor and the panel body, the light control layer comprises a transparent state and a matte state, the light control layer is in the transparent state to allow the incident light to pass through when the color changing layer is in the color state, and the light control layer is in the matte state to scatter the light from the first light sources with a scattering structure of the light control layer when the color changing layer is in the color state.

7. The display panel according to claim 6, wherein the first light sources correspond to the first display region and are disposed on a side of the light control layer away from the panel body.

8. The display panel according to claim 7, wherein the light sensor is disposed in the first backlight portion and is surrounded by the first light sources.

9. The display panel according to claim 8, wherein an outer surface of the light sensor is provided with a reflective layer to reflect the light from the first light sources.

10. The display panel according to claim 7, wherein the backlight module further comprises a backplate and a second backlight portion, the backplate is disposed under the first backlight portion and the second backlight portion, the backplate is provided with a groove corresponding to the first display region, the first light sources are disposed in the groove, the second backlight portion corresponds to the second display region, and the second backlight portion comprises second light sources disposed on the backplate.

11. The display panel according to claim 10, wherein the backplate comprises a first surface, a second surface, and a connecting surface connecting the first surface and the second surface, the first surface is disposed under the second surface, an angle between the connecting surface and the first surface is an obtuse angle, an angle between the connecting surface and the second surface is an obtuse angle, the backplate is provided with a through hole, the first surface, the second surface, and the connecting surface surround the through hole, and the first light sources are disposed on the first surface.

12. The display panel according to claim 10, wherein the backlight module further comprises a second light-shielding layer adjacent to a junction of the first backlight portion and the second backlight portion.

13. The display panel according to claim 10, wherein the backlight module further comprises a reflective sheet disposed on the backplate and between any two of the first light sources.

14. The display panel according to claim 7, wherein the backlight module further comprises a backplate and a second backlight portion, the second backlight portion comprises second light sources, the first light sources and the second light sources are disposed on the backplate and are in a same layer, and a distribution density of the second light sources is less than a distribution density of the first light sources.

15. An electronic device, comprising a display panel, wherein the display panel comprises:

a panel body comprising a first display region and a second display region adjacent to each other and further comprising a plurality of first subpixels positioned in the first display region and a plurality of second subpixels positioned in the second display region, wherein the first subpixels and the second subpixels comprise a first substrate, and the first substrate comprises a color changing layer positioned in the first display region, and a color filter layer positioned in the second display region, wherein the color filter layer and the color changing layer are spaced apart;

a backlight module disposed on a side of the panel body and comprising a first backlight portion, wherein the first backlight portion comprises first light sources corresponding to the first display region; and a light sensor disposed on the side of the panel body and corresponding to the first display region;

wherein the color changing layer further comprises a plurality of color changing units made of electrochromic material, the first substrate further comprises a first black matrix positioned in the first display region, the first black matrix comprises a plurality of openings, each of the color changing units is disposed in a corresponding one of the openings; each of the color changing units comprises a transparent state and a color state, incident light passes through the color changing layer and is received by the light sensor when the color changing unit is in the transparent state, and light from the first light sources passes through the color changing layer when the color changing unit is in the color state.

16. The electronic device according to claim 15, wherein an arrangement of the color changing units is same as an arrangement of the second subpixels away from the first display region when the color changing layer is in the color state.

17. The electronic device according to claim 15, wherein the first backlight portion further comprises a light control layer disposed between the light sensor and the panel body, the light control layer comprises a transparent state and a matte state, the light control layer is in the transparent state to allow the incident light to pass through when the color changing layer is in the color state, and the light control layer is in the matte state to scatter the light from the first light sources with a scattering structure of the light control layer when the color changing layer is in the color state.

* * * * *